United States Patent
Miyairi et al.

(10) Patent No.: US 7,700,051 B2
(45) Date of Patent: Apr. 20, 2010

(54) APPARATUS AND METHOD OF TREATING EXHAUST GAS

(75) Inventors: Yukio Miyairi, Nagoya (JP); Yasumasa Fujioka, Nagoya (JP); Masaaki Masuda, Nagoya (JP); Tatsuhiko Hatano, Kasugai (JP); Takeshi Sakuma, Nagoya (JP); Yuuichiro Imanishi, Nagoya (JP); Keizo Iwama, Shioya-gun (JP); Kenji Dosaka, Shioya-gun (JP)

(73) Assignees: NGK Insulators, Ltd., Nagoya (JP); Honda Motor Co., Ltd., Tokyo (JP)

( * ) Notice: Subject to any disclaimer, the term of this patent is extended or adjusted under 35 U.S.C. 154(b) by 1046 days.

(21) Appl. No.: 10/562,597

(22) PCT Filed: Jun. 25, 2004

(86) PCT No.: PCT/JP2004/009016

§ 371 (c)(1),
(2), (4) Date: Dec. 21, 2005

(87) PCT Pub. No.: WO2005/000450

PCT Pub. Date: Jan. 6, 2005

(65) Prior Publication Data

US 2006/0156985 A1 Jul. 20, 2006

(30) Foreign Application Priority Data

Jun. 27, 2003 (JP) ............................. 2003-184286

(51) Int. Cl.
*B01J 19/08* (2006.01)
(52) U.S. Cl. ................................. 422/186.04
(58) Field of Classification Search ............. 422/186.04
See application file for complete search history.

(56) References Cited

U.S. PATENT DOCUMENTS 5,970,706 A 10/1999 Williamson et al.

(Continued)

FOREIGN PATENT DOCUMENTS

DE 100 26 725 A1 1/2001

(Continued)

OTHER PUBLICATIONS

U.S. Appl. No. 10/561,840, filed Dec. 22, 2005, Yukio Miyairi et al.

(Continued)

*Primary Examiner*—Kishor Mayekar
(74) *Attorney, Agent, or Firm*—Oliff & Berridge, PLC (57) ABSTRACT

An exhaust gas treating apparatus 1 includes; a case body 2 and a plasma producing means 3 capable of producing plasma inside the case body 2 and treats the substances to be treated contained in the exhaust gas by the plasma producing means 3. The plasma producing means 3 has one or more each of a pulse electrode 4 and a ground electrode 5 that are oppositely disposed in the case body 2 and has a pulse power source 6 capable of feeding a pulse current to the pulse electrode 4 by switching frequency and/or voltage for different values at predetermined time intervals. The substances to be treated contained in the exhaust gas can selectively be treated by switching frequency and/or voltage value for different values at predetermined time intervals so that plasma of a kind adequate for the substances to be treated contained in an exhaust gas is produced between the pulse electrode 4 and the ground electrode 5.

17 Claims, 2 Drawing Sheets

U.S. PATENT DOCUMENTS

| | | |
|---|---|---|
| 6,464,945 B1 * | 10/2002 | Hemingway ................ 422/174 |
| 6,517,794 B2 | 2/2003 | Gieshoff et al. |
| 6,558,637 B2 * | 5/2003 | Tamura et al. ......... 422/186.04 |
| 2001/0031310 A1 | 10/2001 | Saeki |
| 2001/0038813 A1 | 11/2001 | Gieshoff et al. |
| 2002/0034590 A1 * | 3/2002 | Dosaka et al. .............. 427/446 |
| 2003/0031609 A1 | 2/2003 | Kinoshita et al. |

FOREIGN PATENT DOCUMENTS

| | | |
|---|---|---|
| EP | 1 149 622 A1 | 10/2001 |
| JP | A-05-144594 | 6/1993 |
| JP | A-05-220340 | 8/1993 |
| JP | A-07-047223 | 2/1995 |
| JP | A-07-155530 | 6/1995 |
| JP | A-08-066620 | 3/1996 |
| JP | A-2001-164925 | 6/2001 |
| JP | A-2001-295629 | 10/2001 |
| JP | A-2002-129949 | 5/2002 |
| JP | A-2002-177734 | 6/2002 |
| JP | A-2002-357119 | 12/2002 |
| JP | A-2004-204739 | 7/2004 |

OTHER PUBLICATIONS

U.S. Appl. No. 10/561,841, filed Dec. 22, 2005, Yukio Miyairi et al.
U.S. Appl. No. 10/562,467, filed Dec. 27, 2005, Yukio Miyairi et al.

* cited by examiner

APPARATUS AND METHOD OF TREATING EXHAUST GAS

CROSS-REFERENCE TO RELATED APPLICATIONS

This application claims priority benefit of PCT Application No. PCT/JP2004/009016, entitled "Apparatus And Method Of Treating Exhaust Gas," by Yukio Miyairi, Yasumasa Fujioka, Masaaki Masuda, Tatsuhiko Hatano, Takeshi Sakuma, Yuuichiro Imanishi, Keizo Iwama, and Kenji Dosaka, filed on Jun. 25, 2004, which is based on Japanese Application No. 2003-184286, entitled "Apparatus And Method Of Treating Exhaust Gas," by the same inventors, filed on Jun. 27, 2003. All of the above applications are incorporated herein by reference in their entirety.

FIELD OF THE INVENTION

The present invention relates to an exhaust gas treating apparatus and an exhaust gas treating method. More particularly, the present invention relates to an exhaust gas treating apparatus and an exhaust gas treating method, which are capable of selectively treating substances to be treated contained in an exhaust gas.

BACKGROUND OF THE INVENTION

There have been known that silent discharge is caused by applying a high-voltage alternating current or a periodic pulse voltage on a dielectric body disposed between two electrodes to generate a plasma field, where an active species, a radical, and an ion are formed to promote reaction and decomposition of gas and that this can be used for removing harmful components contained in engine exhaust gas or exhaust gas from various kinds of incinerators.

For example, there is disclosed a plasma exhaust gas treating system which treats, e.g., $NO_x$, carbon particulate, HC, and CO contained in engine exhaust gas or exhaust gas from various kinds of incinerators by passing the engine exhaust gas or exhaust gas from various kinds of incinerators through the plasma field (see, e.g., Japanese Patent Laid-open No. 164925/2001).

DISCLOSURE OF THE INVENTION

However, there arose a problem that each of a plurality of substances to be treated contained in exhaust gas requires independent electrode for generating plasma adequate for each substance when an exhaust gas containing a plurality of substances because intensity of plasma adequate for treating substances differs depending on each of the substances to be treated contained in exhaust gas, and thereby plasma aiming to treat a predetermined substance cannot treat the other substances. In addition, there arose another problem of increasing electricity consumption because highly intensive plasma has to be generated in the case that a plurality of substances is treated with one kind of plasma using a pair of electrodes. Further, there arose another problem that a $NO_x$ reduction catalyst, which is used together with plasma and which needs fuel (hydrocarbon) contained in exhaust gas for catalyst reaction, cannot sufficiently exhibit its ability because hydrocarbon is completely oxidized by plasma when the $NO_x$ reduction catalyst is used together with highly intensive plasma.

The present invention has been made in view of the above problems and provides an apparatus and a method of treating exhaust gas capable of selectively treating substances to be treated contained in the exhaust gas.

In order to achieve the above aim, according to the present invention, there is provided the following apparatus and method of treating exhaust gas.

[1] An exhaust gas treating apparatus comprising:
a case body functioning as a passage of exhaust gas containing substances to be treated, and
a plasma producing means capable of producing plasma inside the case body; and treating the substances to be treated contained in the exhaust gas by the plasma produced by the plasma producing means;
wherein the plasma producing means has one or more each of a pulse electrode and a ground electrode that are oppositely disposed in the case body and has a pulse power source capable of feeding a pulse current to the pulse electrode, and by switching frequency and/or voltage value for different values at predetermined time intervals so that plasma of a kind adequate for the substances to be treated contained in an exhaust gas is produced between the pulse electrode and the ground electrode, the substances to be treated in the exhaust gas can selectively be treated (hereinafter sometimes referred to as "first invention").

[2] An exhaust gas treating apparatus according to the above [1], wherein the predetermined time intervals are 0.01 to 500 seconds.

[3] An exhaust gas treating apparatus according to the above [1] or [2], wherein the pulse power source can feed a pulse current by switching from a first pulse current having a frequency of 100 to 1000 Hz to a second pulse current having a frequency of 500 to 2500 Hz, and vice versa.

[4] An exhaust gas treating apparatus according to any one of the above [1] to [3], wherein the pulse power source can feed a pulse current by switching from a third pulse current having a voltage value of 2 to 5 kV to a fourth pulse current having a voltage value of 3 to 20 kV, and vice versa.

[5] An exhaust gas treating apparatus according to any one of the above [1] to [4], wherein the pulse electrode and/or the ground electrode comprise(s) a ceramic body functioning as a dielectric body and a conductive film disposed in the ceramic body.

[6] An exhaust gas treating apparatus according to any one of the above [1] to [5], which further comprises a catalyst on a downstream side of the plasma producing means in the passage of exhaust gas.

[7] An exhaust gas treating method treating substances to be treated contained in exhaust gas by plasma by producing the plasma in a passage of the exhaust gas containing the substances to be treated, wherein one or more each of a pulse electrode and a ground electrode are oppositely disposed, and a pulse current is fed by switching frequency and/or voltage value for different values at predetermined time intervals so that plasma of a kind adequate for the substances to be treated contained in the exhaust gas is produced between the pulse electrode and the ground electrode to selectively treat the substances to be treated in the exhaust gas (hereinafter sometimes referred to as "second invention").

[8] An exhaust gas treating method according to the above [7], wherein the predetermined time intervals are 0.01 to 500 seconds.

[9] An exhaust gas treating method according to the above [7] or [8], wherein the pulse power source can feed a pulse current by switching from a first pulse current having a frequency of 100 to 1000 Hz to a second pulse current having a frequency of 500 to 2500 Hz, and vice versa.

[10] An exhaust gas treating method according to any one of the above [7] to [9], wherein the pulse power source can feed a pulse current by switching from a third pulse current having a voltage value of 2 to 5 kV to a fourth pulse current having a voltage value of 3 to 20 kV, and vice versa.

[11] An exhaust gas treating method according to any one of the above [7] to [10], wherein the exhaust gas is exhausted from an automobile engine, and the pulse current is supplied by switching, step-by-step, frequency and/or voltage for different values at predetermined time intervals in correspondence with change in revolution and/or load of the engine.

[12] An exhaust gas treating method according to any one of the above [7] to [11], wherein the exhaust gas is exhausted from an automobile engine, and the predetermined time intervals for switching frequency and/or voltage value for different values is changed step-by-step in correspondence with change in revolution and/or load of the engine.

[13] An exhaust gas treating method according to any one of the above [7] to [12], wherein a catalyst is further disposed on a downstream side of the portion where the plasma is produced in the passage of exhaust gas to further treat exhaust gas passed through the plasma by the catalyst.

BRIEF DESCRIPTION OF THE DRAWINGS

FIG. 3($a$) is a schematic view showing a process of collecting soot on the ground electrode in an embodiment of an exhaust gas treating apparatus of the present invention (first invention).

FIG. 3($b$) is a schematic view showing a process of collecting soot on the ground electrode in an embodiment of an exhaust gas treating apparatus of the present invention (first invention).

BEST MODE FOR CARRYING OUT THE INVENTION

Examples

Embodiments of an apparatus and a method of treating an exhaust gas of the present invention will hereinbelow be described in detail based on Figures. However, the present invention is not limited to the embodiments, and various changes, modifications, and improvements may be given based on the knowledge of those in the art as long as they deviate from the scope of the present invention.

Figure 1:
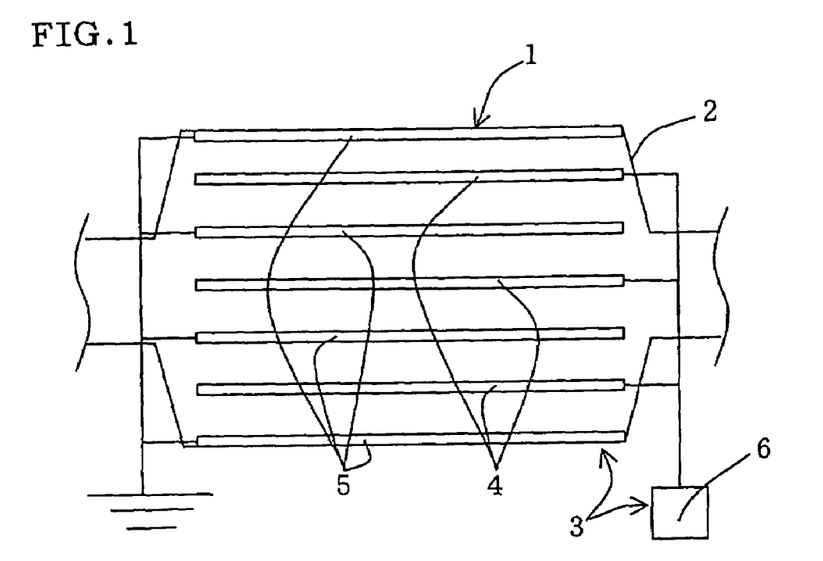
FIG. 1 is a schematic view showing an embodiment of an exhaust gas treating apparatus of the present invention (first invention).

In the first place, an exhaust gas apparatus of an embodiment of the present invention (first invention) is described. As shown in FIG. 1, an exhaust gas treating apparatus 1 of the present embodiment is provided with a case body 2 functioning as a passage of exhaust gas containing substances to be treated and a plasma producing means 3 capable of producing plasma inside the case body 2, and treats the substances to be treated contained in the exhaust gas by the plasma produced by the plasma producing means 3; wherein the plasma producing means 3 has one or more each of a pulse electrode 4 and a ground electrode 5 that are oppositely disposed in the case body 2 and has a pulse power source 6 capable of feeding a pulse current to the pulse electrode 4, and by switching frequency and/or voltage value of the pulse current fed from the pulse power source 6 for different values at predetermined time intervals so that plasma of a kind adequate for the substances to be treated contained in an exhaust gas is produced between the pulse electrode 4 and the ground electrode 5, the substances to be treated in the exhaust gas can selectively be treated.

Figure 2:
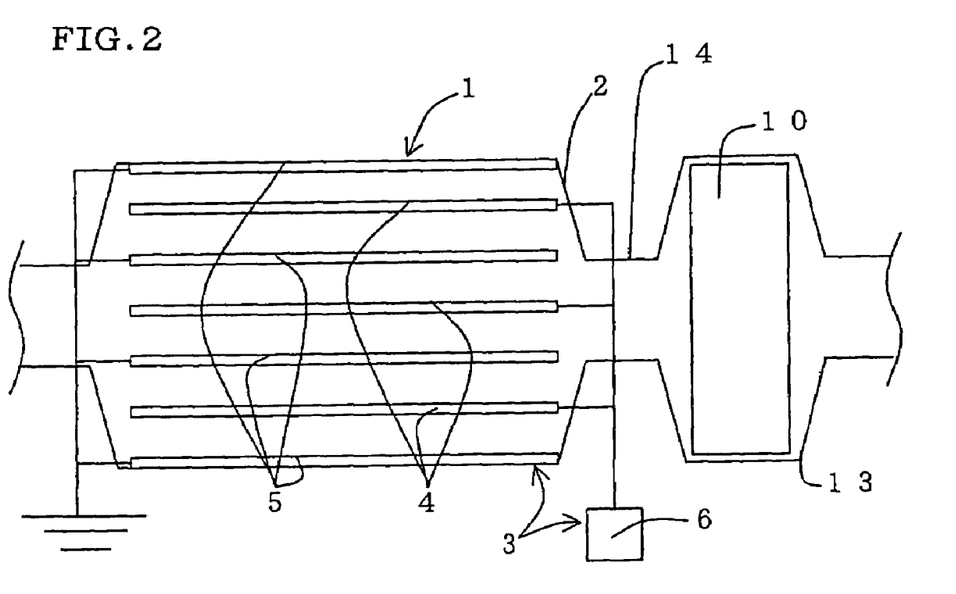
FIG. 2 is a schematic view showing another embodiment of an exhaust gas treating apparatus of the present invention (first invention).

In addition, an exhaust gas treating apparatus of the present embodiment may have the constitution further provided with a catalyst 10 on the downstream side of the plasma producing means 3 in an exhaust gas passage, for example, as shown in FIG. 2. By employing a catalyst which promotes $NO_x$ decomposition reaction as the catalyst 10, it becomes possible to treat $NO_2$, or the like, which is difficult to be treated by plasma, by decomposition (reduction), and thereby exhausted gas can be discharged outside in cleaner condition.

For example, in the present embodiment, it is preferable that the pulse power source 6 can feed a current by switching at predetermined time intervals the first pulse current (hereinafter sometimes referred to as a "low-frequency pulse current") having a relatively low frequency and capable of producing plasma adequate for treating nitrogen monoxide (NO), which is one of the substances to be treated contained in an exhaust gas, and the second pulse current (hereinafter sometimes referred to as a "high-frequency pulse current") having a relatively high frequency and capable of producing plasma adequate for treating soot, which is one of the substances to be treated contained in exhaust gas. By this constitution, it is possible to oxidize nitrogen monoxide (NO) to nitrogen dioxide ($NO_2$) by plasma produced by a low-frequency pulse current (hereinafter sometimes referred to as "low-frequency plasma) and to produce well aldehyde, or the like, effective in improving performance of a $NO_x$ reduction catalyst by moderately oxidizing hydrocarbon (HC) contained in an exhaust gas. In addition, though it is almost impossible that low-frequency plasma treats soot contained in exhaust gas, it is possible to inhibit soot from being discharged outside the case body 2 without being treated because soot can be collected on the ground electrode 5 side by electrostatic collecting.

Figure 3A:
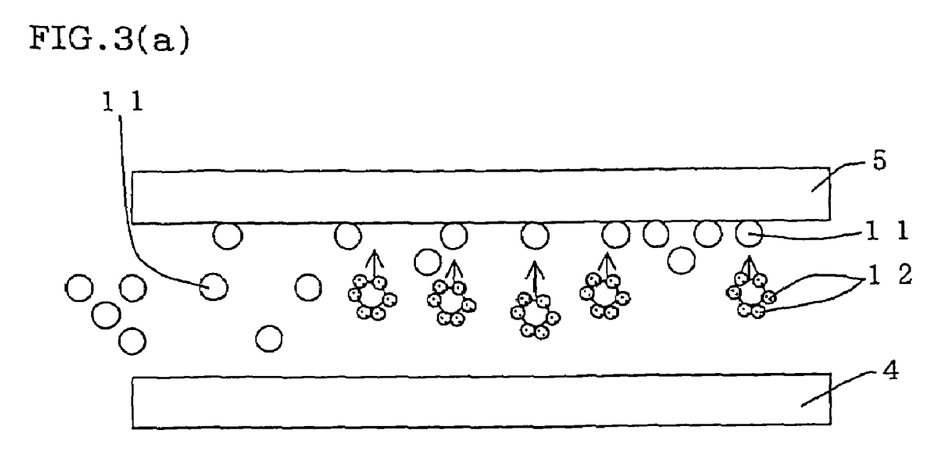

The above electrostatic collecting is conducted in such a manner that an electron 12 adheres to soot 11, the soot 11 is negatively electrified, and the soot 11 to which the electron 12 adheres is drawn on the positive electrode side, i.e., the ground electrode 5 side as shown in FIG. 3($a$).

Figure 3B:
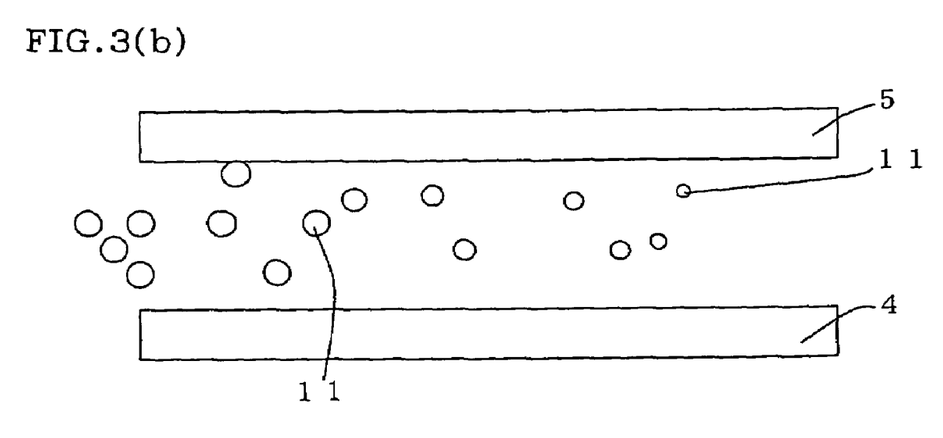

Plasma produced by a high-frequency pulse current (hereinafter sometimes referred to as "high-frequency plasma") switched from a low-frequency pulse current can treat by oxidation at a stroke to the soot 11 collected on the ground electrode 5 side and the soot 11 contained in the exhaust gas newly flew in with high-frequency plasma having high oxidizability as shown FIG. 3($b$). Needless to say, nitrogen monoxide (NO) can be treated by oxidation to give nitrogen dioxide ($NO_2$) with the high-frequency plasma. However, since the high-frequency plasma has high oxidizability, most of hydrocarbon (HC) is completely oxidized by carbon dioxide ($CO_2$) and water.

In a conventional exhaust gas treating apparatus, a kind of plasma treatment was conducted in the case of treating substance to be treated using plasma. However, since an oxidizing treatment on soot requiring relatively high oxidizability and effective production of aldehyde, or the like having an effect in improving performance of a $NO_x$ reduction catalyst are antinomic as described above, they could not stand together.

In an exhaust gas treating apparatus of the present embodiment, since plasma having different conditions is produced at predetermined time intervals, substances to be treated can selectively be treated with at least one pair of electrodes (a pulse electrode 4 and a ground electrode 5) by producing aldehyde or the like having an effect in improving performance of a $NO_x$ reduction catalyst with treating NO on the one hand and treating soot requiring oxidizability on the other hand.

In an exhaust gas treating apparatus 1 of the present embodiment as shown in FIG. 1, excited oxygen, which is excited by plasma actually oxidizes the substances to be treated contained in the exhaust gas passing between the pulse electrode 4 and the ground electrode 5, and the amount of the oxygen in the excited state closely relates to oxidizability of the plasma. Oxygen in the excited state includes triplet excited oxygen (3P), which is stable and has low oxidizability, and singlet excited oxygen (1D), which is unstable and high oxidizability. More singlet excited oxygen (1D) is present in high-frequency plasma than in low-frequency plasma. Therefore, low-frequency plasma is adequate for oxidation of NO, and high-frequency plasma is adequate for oxidation of soot.

However, since the singlet excited oxygen (1D) is unstable and has a short life span, sometimes the singlet excited oxygen (1D) is not diffused widely between the electrodes to exhibit insufficient oxidizability. In particular, oxidizability is sometimes further lowered because an electron sheath where plasma is hardly produced is formed in the periphery of soot collected by the electrode.

Therefore, it is preferable that an exhaust gas treating apparatus 1 of the present embodiment not only directly produce the singlet excited oxygen (1D) with high-frequency plasma, but also produce ozone ($O_3$) with plasma produced between the electrodes and photodissociate the obtained ozone by emission of plasma to produce more singlet excited oxygen (1D). Specifically, ozone ($O_3$) is dissociated to an oxygen molecule ($O_2$) and singlet excited oxygen (1D) with light having a wavelength of 310 nm or less, and therefore, it is possible to produce more singlet excited oxygen (1D) by dissociating ozone ($O_3$) produced by low-frequency plasma with emission of high-frequency plasma by making the exhaust gas treating apparatus 1 possible to feed a pulse current by switching the pulse power source 6 between a pulse current having a frequency capable of obtaining low-frequency plasma adequate for effectively producing ozone ($O_3$) and a pulse current having a frequency capable of obtaining high-frequency plasma adequate for emission of light containing much light having a wavelength of 310 nm or less. Further, by using ozone ($O_3$), the singlet excited oxygen (1D) is effectively produced even in the electron sheath where plasma is hardly produced.

It is preferable that the pulse power source 6 used in the present embodiment can feed a pulse current by switching the first pulse current having a frequency of 100 to 1000 Hz and the second pulse current having a frequency of 500 to 2500 Hz for effectively obtaining the aforementioned function and effect.

The pulse power source 6 used in the present embodiment may be able to feed a pulse current by switching to different voltage value at predetermined time intervals with keeping frequency the same. Alternatively, it may be able to feed a pulse current by switching to different frequency and different voltage value at predetermined time intervals. In the case that a pulse current is fed by switching to different voltage value, the apparatus should be able to switch the pulse power source 6 between the third pulse current (hereinafter sometimes referred to as a "low-voltage pulse current") having relatively low voltage value and being capable of producing plasma adequate for treating nitrogen monoxide (NO), which is one of the substances to be treated contained in an exhaust gas and the fourth pulse current (hereinafter sometimes referred to as a "high-voltage pulse current") having relatively high voltage and being capable of producing plasma adequate for treating soot, which is one of the substances to be treated contained in an exhaust gas. By this constitution, the same function and effect as in the aforementioned case having different frequencies can be obtained. In particular, by changing a low-frequency pulse current to low voltage to generate more ozone with low-frequency low-voltage plasma and further changing a high-frequency pulse current to high-voltage to increase emission of high-frequency high-voltage plasma and promote dissociation of ozone, efficiency of oxidizing soot contained in an exhaust gas can further be improved.

In the case when pulse currents having different voltage values are fed, the voltage value of each pulse current is not particularly limited. For example, in the case of treating an automobile exhaust gas, the pulse power source 6 is preferably able to feed a pulse current by switching the third pulse current of 2 to 5 kV (low-voltage pulse current) and the fourth pulse current of 3 to 20 kV (high-voltage pulse current). When the voltage value of the third pulse current (low-voltage pulse current) is below 2 kV, oxidation of NO is sometimes insufficient. When the voltage value of the third pulse current (low-voltage pulse current) is above 5 kV, hydrocarbon is sometimes oxidized completely. When the voltage value of the fourth pulse current (high-voltage pulse current) is below 3 kV, oxidation of soot is sometimes insufficient. When the voltage value of the fourth pulse current (high-voltage pulse current) is above 20 kV, the pulse power source 6 is too large, which causes a problem of mounting and sometimes causes a problem of electromagnetic trouble to the circumference.

Though a time interval for switching frequencies and/or voltage values depends on the size of the exhaust gas treating apparatus 1, each frequency, each voltage value, etc., it is preferably 0.01 to 500 seconds, and more preferably 0.01 to 10 seconds. A time interval for switching the above-mentioned frequencies may be determined by a pulse number in each condition. For example, in the case of treating an automobile exhaust gas with feeding a pulse current by switching between two kinds of frequencies, the time interval is predetermined in such a manner that the pulse number of the low-frequency pulse current is preferably 1 to 50000 times, more preferably 3 to 50000 times, with respect to one pulse of the high-frequency pulse current having higher frequency. When the pulse number of the low-frequency pulse current with respect to one pulse of the high-frequency pulse current is below 1, production of aldehyde, or the like effective in improving performance of a $NO_x$ reduction catalyst is sometimes insufficient. When the pulse number of the low-frequency pulse current with respect to one pulse of the high-frequency pulse current is above 50000, time for collecting soot on the ground electrode 5 becomes too long, and the soot sometimes cannot be treated completely by high frequency plasma after switching frequency. Incidentally, the same applies in the case of voltage value.

As length (period) of a pulse of a pulse current fed from the pulse power source 6 used in the present embodiment, in the case of feeding a pulse current with switching two kinds of frequency, the time corresponding with a half width of the maximum voltage value of one pulse is preferably 0.8 to 200 μsec., more preferably 0.8 to 50 μsec. for the length (period) of one pulse having high frequency. When the length of one pulse of a pulse current is below 0.8 μsec., efficiency of oxidizing soot is sometimes lowered. When it is above 50 μsec., a consumption amount of electric power sometimes increases. For the length (period) of one pulse having low frequency, the time corresponding with a half width of the maximum voltage value of one pulse is preferably 1 to 500 μsec., more preferably 1 to 100 μsec. When the length of one pulse of a pulse current is below 1 μsec., efficiency of oxidizing NO is sometimes lowered, and an effect of electrostatic collection is sometimes insufficient. When it is above 50 μsec., efficiency of electric power is sometimes lowered.

A pulse power source 6 used in the present embodiment is not particularly limited as long as it can feed a pulse current as described above. For example, there may suitably be used a pulse power source using a thyristor, a pulse power source using a transistor other than a thyristor, or the like.

Though there is no particular limitation on constitution of the pulse electrode 4 and the ground electrode 5 used in the present embodiment, it is preferable that the constitution can produce plasma uniformly between the electrodes. For example, as the electrode on the negative electrode (pulse electrode 4) side, there may suitably be used an electrode constituted by a ceramic body functioning as a dielectric body and a conductive film disposed inside the ceramic body. Though the electrode on the positive electrode (ground electrode 5) side is preferably a conductive body from the viewpoint of maintaining electrostatic collection, it may be an electrode having the same structure as the negative electrode. In addition, though distance between the pulse electrode 4 and the ground electrode 5 is not particularly limited, it is preferably 0.3 to 5 mm so that plasma can effectively be produced between oppositely disposed electrodes. When the distance is above 5 mm, effect in collecting dust is sometimes insufficiently obtained. In addition, it is preferable that a plurality of pulse electrodes 4 and ground electrodes 5 are disposed, for example, in a laminated condition alternately so that a ground electrode 5 faces a pulse electrode 4 on each side of the pulse electrode as shown in FIG. 1. The number of the pulse electrodes 4 and the ground electrodes 5 is not particularly limited.

Though there is no particular limitation on material for a case body 2 used in the present embodiment, in the case of disposing an exhaust gas treating apparatus 1 of the present embodiment in, for example, an automobile, a conductive metal is used as the material for the case body 2. It is preferable to connect a part of the case body 2 with the ground electrode 5 and further with a ground line of the automobile, or the like electrically.

In the exhaust gas treating apparatus 1 shown in FIG. 2, a plasma producing means 3 disposed on the exhaust gas generating side (upstream side) of an exhaust gas passage is connected with a catalyst 10 disposed on the exhaust side via a pipe 14. Incidentally, there may be employed the constitution where the catalyst 10 on the downstream side is directly connected with the plasma producing means 3 in the present embodiment.

The exhaust gas treating apparatus 1 shown in FIG. 2 can purify, for example, $NO_x$ in an exhaust gas in an oxygen excess atmosphere. That is, with plasma produced by the plasma producing means 3, $NO_x$ is reformed so that it is easily purified by the catalyst 10 on the downstream side, or HC (hydrocarbon), or the like in an exhaust gas is reformed so that it easily reacts with $NO_x$, and $NO_x$ is purified by the catalyst 10.

The plasma producing means 3 used in the exhaust gas treating apparatus 1 converts $NO_x$ in exhaust gas generated by combustion of a lean burn, gasoline-injection engine, a diesel engine, or the like, in an oxygen excess atmosphere into $NO_2$ by plasma. In addition, the plasma producing means 3 produces an active species from HC, or the like in an exhaust gas, and constituted in a manner similar to the plasma producing means 3 shown in FIG. 1 can suitably be employed.

The catalyst 10 is disposed on the downstream side of the plasma producing means 3 in the exhaust system as a catalyst unit 13 provided with a catalyst member including a substrate having a plurality of fine pores where an exhaust gas passes. The catalyst member has a substrate and a catalyst layer formed so as to cover the inner wall surface surrounding the plurality of fine pores of the substrate. The catalyst unit 13 is exemplified by a conventionally known $NO_x$ treating apparatus.

Since the catalyst layer is produced generally by immersing the substrate in a slurried catalyst (catalyst slurry) as described below, it is sometimes called a wash coat (layer).

A shape of the substrate is not particularly limited in the present invention as long as it has a space where an exhaust gas circulates, and a honeycomb-shaped substrate having a plurality of fine pores is used in the present embodiment.

The substrate is preferably formed with material having thermal resistance. Examples of such material include ceramics such as cordierite, mullite, silicon carbide (SiC), and silicon nitride ($Si_3N_4$) and metals (e.g., stainless steel).

The catalyst layer is formed using a carrier of porous material and one selected from Pt, Pd, Rh, Au, Ag, Cu, Fe, Ni, Ir, Ga, and the like, or a combination thereof which is loaded on a surface of the carrier of porous material as the main portion. Inside the catalyst layer, a plurality of continuous fine pores which continue to the fine pores of the substrate.

The porous carrier can be produced by using one suitably selected from, for example, alumina, zeolite, silica, titania, zirconia, silica alumina, ceria, and the like. Incidentally, a catalyst, which promotes decomposition reaction of $NO_x$ is used as the catalyst 10.

Next, an embodiment of an exhaust gas treating method of the present invention (second invention) is specifically described. An exhaust gas treating method of the present embodiment treats substances to be treated contained in an exhaust gas by plasma produced in a passage of the exhaust gas containing the substances to be treated, wherein one or more each of a pulse electrode and a ground electrode are oppositely disposed, and a pulse current is fed by switching frequency and/or voltage value for different values at predetermined time intervals so that plasma of a kind adequate for the substances to be treated contained in an exhaust gas is produced between the pulse electrode and the ground electrode to selectively treat the substances to be treated in the exhaust gas.

By this constitution, substances to be treated contained in an exhaust gas can selectively be treated by feeding a pulse current by switching between a pulse current having low frequency (hereinafter sometimes referred to as a "low-frequency pulse current") adequate for treating nitrogen monoxide (NO) contained in an exhaust gas and a pulse current having high frequency (hereinafter sometimes referred to as a "high-frequency pulse current") adequate for treating soot in the case of, for example, treating an exhaust gas discharged from an automobile engine.

Plasma produced by a low-frequency pulse current (hereinafter sometimes referred to as "low-frequency plasma") can effectively treat nitrogen monoxide (NO), which is a substance contained in exhaust gas by oxidation to give nitrogen dioxide ($NO_2$) and moderately oxidize hydrocarbon (HC) contained in an exhaust gas to produce aldehyde, or the like, which has an effect in improving performance of a $NO_x$ reduction catalyst. In addition, though low-frequency plasma cannot treat soot contained in an exhaust gas, since it can collect soot on the ground electrode side by an effect of electrostatic collection, it can effectively inhibit soot from being discharged outside without being treated.

Plasma produced by a high-frequency pulse current (hereinafter sometimes referred to as "high-frequency plasma") can give an oxidizing treatment at a stroke to the soot collected on the ground electrode side and the soot contained in the exhaust gas newly flew in with plasma having high oxidizability. Needless to say, nitrogen monoxide (NO) can be treated to be oxidized to give nitrogen dioxide ($NO_2$) by the plasma having high oxidizability.

Therefore, according to an exhaust gas treating method of the present embodiment, soot contained in an exhaust gas can effectively be oxidized, and aldehyde, or the like, having an effect in improving performance of a $NO_x$ reduction catalyst can be produced, and thereby an exhaust gas can effectively be treated by an exhaust gas treating method of the present embodiment, for example, as an exhaust gas treatment before the exhaust gas is introduced into a $NO_x$ treating apparatus using a $NO_x$ reduction catalyst.

In an exhaust gas treating method of the present embodiment, a pulse current is preferably fed by switching between the first pulse current having a relatively low frequency of 100 to 1000 Hz and the second pulse current having a relatively high frequency of 500 to 2500 Hz.

In the present embodiment, a pulse current may be fed by switching voltage value for different values at predetermined time intervals with keeping frequency the same. Alternatively, a pulse current may be fed by switching frequency and voltage value for different values at predetermined time intervals. In the case of feeding a pulse current by switching voltage value for different values, it is preferable to alternately feed the third pulse current having relatively low voltage value (hereinafter sometimes referred to as a "low-voltage pulse current") capable of producing plasma adequate for treating nitrogen monoxide (NO) which is one of the substances to be treated contained in exhaust gas and the fourth pulse current having relatively high voltage value (hereinafter sometimes referred to as a "high-voltage pulse current") capable of treating soot which is one of the substances to be treated contained in exhaust gas. This constitution can give the same function and effect as the case having different frequencies described above. In particular, by changing a low-frequency pulse current to low voltage to generate more ozone with low-frequency low-voltage plasma and further changing a high-frequency pulse current to high-voltage to increase emission of high-frequency high-voltage plasma and promote dissociation of ozone, efficiency of oxidizing soot contained in an exhaust gas can further be improved.

In the case when pulse currents having different voltage values are fed, the voltage value of each pulse current is not particularly limited. For example, in the case of treating an automobile exhaust gas, the pulse power source is preferably able to feed a pulse current by switching the third pulse current of 2 to 5 kV (low-voltage pulse current) and the fourth pulse current of 3 to 20 kV (high-voltage pulse current). When the voltage value of the third pulse current (low-voltage pulse current) is below 2 kV, oxidation of NO is sometimes insufficient. When the voltage value of the third pulse current (low-voltage pulse current) is above 5 kV, hydrocarbon is sometimes oxidized completely. When the voltage value of the fourth pulse current (high-voltage pulse current) is below 3 kV, oxidation of soot is sometimes insufficient. When the voltage value of the fourth pulse current (high-voltage pulse current) is above 20 kV, the pulse power source is too large, which causes a problem of mounting and sometimes causes a problem of electromagnetic trouble to the circumference.

Though a time interval for switching frequencies depends on the size of the pulse electrode, each frequency, each voltage value, etc., it is preferably 0.01 to 500 seconds, and more preferably 0.01 to 10 seconds. A time interval for switching the above-mentioned frequencies may be determined by a pulse number in each condition. For example, in the case of treating an automobile exhaust gas with feeding a pulse current by switching between two kinds of frequencies, the time interval is predetermined in such a manner that the pulse number of the low-frequency pulse current is preferably 1 to 50000 times, more preferably 3 to 50000 times, with respect to one pulse of the high-frequency pulse current having higher frequency. When the pulse number of the low-frequency pulse current with respect to one pulse of the high-frequency pulse current is below 1, production of aldehyde, or the like effective in improving performance of a $NO_x$ reduction catalyst is sometimes insufficient. When the pulse number of the low-frequency pulse current with respect to one pulse of the high-frequency pulse current is above 50000, time for collecting soot on the ground electrode 5 becomes too long, and the soot sometimes cannot be treated completely by high frequency plasma after switching frequency. Incidentally, the same applies in the case of voltage value.

Incidentally, as a pulse electrode, a ground electrode, and a power source (pulse power source) for feeding a pulse current used for an exhaust gas treating method of the present embodiment, the pulse electrode, ground electrode and pulse power source described in the embodiment of the first invention can suitable be employed.

Since components of an engine exhaust gas of an automobile greatly changes in accordance with changes of driving conditions of an engine, various kinds of conditions for producing plasma adequate for treating an exhaust gas, i.e., adequate values of voltage of a pulse current, frequency, time intervals for switching these, etc., are sometimes different in accordance with this change. Therefore, in the present embodiment, in the case of an exhaust gas discharged from an automobile engine, it is preferable to feed a pulse current by switching frequency and/or voltage value for different values in stages at predetermined time intervals in correspondence with change in revolution and/or load of the engine, and it is preferable that the predetermined time for switching frequency and/or voltage value for different values is changed step-by-step in correspondence with change in revolution and/or load of the engine. For example, it is preferable to previously determine values of two or more stages for frequency and/or voltage value and time intervals for switching these in correspondence with change in revolution and/or load of the engine so as to change frequency and/or voltage value and time intervals for switching these according to driving conditions of the engine.

As the engine driving conditions, revolution and load are important, and by controlling various signals which relate to these, e.g., an output signal of a revolution meter, an output signal of an intake-air flowmeter, a control signal for a fuel injection amount, an accelerator opening signal, an exhaust gas temperature signal, and an exhaust $NO_x$ concentration signal, for example, frequency and/or voltage value and time intervals for switching these can be controlled to one of the previously determined values in two or more stages. Signals for the control are not limited to the signals described above, and it is, of course possible to use another signal which relates to revolution and load.

In an exhaust gas of the present embodiment, an exhaust gas treating apparatus 1 having a catalyst 10 may be disposed on downstream side of a portion where plasma is generated in an exhaust gas passage as shown in FIG. 2 to further treat an exhaust gas after passing the plasma. As described above, the exhaust gas treating apparatus 1 shown in FIG. 2 is provided with a plasma producing means 3 disposed in an exhaust gas passage and a catalyst 10 disposed on downstream side of the plasma producing means 3. A catalyst facilitating $NO_x$ decomposition reaction, e.g., a $NO_x$ reduction catalyst is used as the catalyst 10. By treating exhaust gas with such an exhaust gas treating apparatus 1, $NO_x$ such as $NO_2$, which has difficulty in treating by plasma, can be decomposed (reduced), and exhaust gas can be discharged outside in a cleaner condition.

The present invention is hereinbelow described specifically with referring to Examples. However, the present invention is by no means limited to these Examples.

Examples 1 to 7

Pulse electrodes and ground electrodes were formed by disposing a tungsten conductive film by printing inside a ceramic body constituted by alumina. Five pulse electrodes and five ground electrodes were alternately disposed oppositely inside a case body, and further a pulse power source capable of switching frequencies and voltage values was connected to the pulse electrodes to obtain an exhaust gas treating apparatus (Examples 1 to 7).

Each of the pulse electrodes and ground electrodes had dimensions of 90 mm×50 mm×1 mm thick. Distance (mm) between the oppositely disposed electrodes in the exhaust gas treating apparatus of each Example is shown in Table 1.

As shown in Table 1, pulse currents having different frequencies and voltage values was fed to an exhaust gas treating apparatus in each of Examples 1 to 7 at two time intervals of Period A and Period B. Frequencies (Hz), voltage values (kV) in Period A and Period B and the numbers of pulse (time) of pulse currents in each period are shown in Table 1.

An exhaust gas imitating an exhaust gas discharged from an engine was sent to the exhaust gas treating apparatus in each of Examples 1 to 7. The exhaust gas contained a mixed gas consisting of 10% by volume of oxygen, 10% by volume of $CO_2$, 133 ppm of propylene, 67 ppm of propane, 200 ppm of NO gas, and nitrogen as the rest and soot mixed in the gas at 1000 mg/hr. There was measured concentration of hydrocarbon (HC), nitrogen monoxide (NO), and nitrogen dioxide ($NO_2$) contained in gas after the treatment with an exhaust gas treating apparatus; presence/absence of aldehyde, and mass of soot after the treatment. The results are shown in Table 1. Incidentally, concentration of hydrocarbon is shown by mass in terms of carbon (ppmC).

The exhaust gas treated with an exhaust gas treating apparatus of Examples 1 to 7 had reduced nitrogen monoxide (NO) and contained aldehyde, which has an effect in improving performance of a $NO_x$ reduction catalyst. In addition, soot was also reduced to an amount less than the detectable limit of the detection apparatus.

Comparative Examples 1 to 5

There were produced an exhaust gas treating apparatuses (Comparative Examples 1 to 5) having the same constitution as the exhaust gas treating apparatus of Example 1 except that the power source constituting the exhaust gas treating apparatus can feed a pulse current having only one kind of frequency and voltage value. Distance (mm), frequency (Hz) and voltage value (kV) of each space between adjacent electrodes are shown in Table 1.

An exhaust gas was sent to each exhaust gas treating apparatus of Comparative Examples 1 to 5 in the same manner as in Example 1, and there was measured concentration of hydrocarbon (HC), nitrogen monoxide (NO), and nitrogen dioxide ($NO_2$) contained in gas after the treatment with an exhaust gas treating apparatus; presence/absence of alde-

TABLE 1

| | Distance between electrodes (mm) | Period A | | | Period B | | | Gas concentration after treatment | | | | | |
|---|---|---|---|---|---|---|---|---|---|---|---|---|---|
| | | Voltage value (kV) | Frequency (Hz) | Number of pulse (time) | Voltage value (kV) | Frequency (Hz) | Number of pulse (time) | HC (ppmC) | NO (ppm) | $NO_2$ (ppm) | Presence of aldehyde | Soot (mg/hr) | Remaining soot in apparatus |
| Example 1 | 0.8 | 4 | 500 | 10 | 2 | 500 | 10 | 100 | 50 | 150 | Present | undetectable | Absent |
| Example 2 | 0.8 | 4 | 500 | 3 | 2 | 500 | 10 | 150 | 50 | 150 | Present | undetectable | Absent |
| Example 3 | 0.8 | 3 | 1000 | 10 | 2 | 500 | 10 | 100 | 50 | 150 | Present | undetectable | Absent |
| Example 4 | 0.8 | 3 | 1000 | 3 | 2 | 500 | 10 | 150 | 50 | 150 | Present | undetectable | Absent |
| Example 5 | 1.2 | 5 | 1000 | 3 | 3 | 500 | 10 | 160 | 50 | 150 | Present | undetectable | Absent |
| Example 6 | 1.2 | 3 | 1500 | 3 | 2 | 500 | 10 | 170 | 80 | 120 | Present | undetectable | Absent |
| Example 7 | 1.2 | 5 | 500 | 3 | 3 | 200 | 100000 | 190 | 60 | 140 | Present | undetectable | Absent |
| Comp. Ex. 1 | 0.8 | 4 | 500 | — | — | — | — | undetectable | 40 | 150 | undetectable | undetectable | Absent |
| Comp. Ex. 2 | 0.8 | 2 | 500 | — | — | — | — | 150 | 50 | 150 | Present | 100 | Present |
| Comp. Ex. 3 | 0.8 | 1 | 500 | — | — | — | — | 200 | 160 | 40 | Present | 1000 | Present |
| Comp. Ex. 4 | 0.8 | 3 | 1000 | — | — | — | — | undetectable | 40 | 150 | undetectable | undetectable | Absent |
| Comp. Ex. 5 | 1.2 | 2 | 500 | — | — | — | — | 190 | 100 | 100 | Present | 200 | Present | hyde, and mass of soot after the treatment. The results are shown in Table 1. Incidentally, concentration of hydrocarbon is shown by mass in terms of carbon (ppmC).

Though soot was not detected from the exhaust gas treated with any exhaust gas treating apparatus of Comparative Examples 1 to 4, neither aldehyde, which has an effect in improving performance of a $NO_x$ reduction catalyst, nor hydrocarbon (HC) were detected. Though aldehyde was detected from the exhaust gas treated with an exhaust gas treating apparatus of Comparative Examples 2 or 3, a large amount of soot was contained.

INDUSTRIAL APPLICABILITY

As described above, according to the present invention, there can be provided an exhaust gas treating apparatus and an exhaust gas treating method capable of selectively treating substances to be treated contained in an exhaust gas.

The invention claimed is:

1. An exhaust gas treating apparatus comprising:
   a case body functioning as a passage of exhaust gas containing substances to be treated, and
   a plasma producing means capable of producing plasma inside the case body for treating the substances to be treated contained in the exhaust gas;
   wherein the plasma producing means has one or more each of a pulse electrode and a ground electrode that are oppositely disposed in the case body and has a pulse power source capable of feeding a pulse current to the pulse electrode, and the pulse power source is capable of automatically switching frequency and/or voltage for different values at predetermined time intervals so that plasma of a kind adequate for the substances to be treated contained in an exhaust gas is produced between the pulse electrode and the ground electrode to selectively treat the substances to be treated in the exhaust gas.

2. An exhaust gas treating apparatus according to claim 1, wherein the predetermined time intervals are 0.01 to 500 seconds.

3. An exhaust gas treating apparatus according to claim 1, wherein the pulse power source is capable of feeding a pulse current by switching from a first pulse current having a frequency of 100 to 1000 Hz to a second pulse current having a frequency of 500 to 2500 Hz, and vice versa.

4. An exhaust gas treating apparatus according to claim 1, wherein the pulse power source is capable of feeding a pulse current by switching from a third pulse current having a voltage value of 2 to 5 kV to a fourth pulse current having a voltage value of 3 to 20 kV, and vice versa.

5. An exhaust gas treating apparatus according to claim 1, wherein the pulse electrode and/or the ground electrode comprise(s) a ceramic body functioning as a dielectric body and a conductive film disposed in the ceramic body.

6. An exhaust gas treating apparatus according to claim 1, which further comprises a catalyst on a downstream side of the plasma producing means in the passage of exhaust gas.

7. The exhaust gas treating apparatus according to claim 1, wherein the pulse power source is configured to switch the pulse current between a low-voltage pulse current and a high-voltage pulse current, the low-voltage pulse current and high-voltage pulse currents having non-zero voltages.

8. An exhaust gas treating method for treating substances to be treated contained in an exhaust gas by plasma produced in a passage of the exhaust gas containing the substances to be treated, the passage having one or more each of a pulse electrode and a ground electrode that are oppositely disposed, the method comprising:
   switching frequency and/or voltage for different values at predetermined time intervals to feed a pulse current that produces plasma between the pulse electrode and the ground electrode, the plasma being of a kind adequate for the substances to be treated contained in an exhaust gas; and
   selectively treating the substances to be treated in the exhaust gas with the plasma.

9. An exhaust gas treating method according to claim 8, wherein the predetermined time intervals are 0.01 to 500 seconds.

10. An exhaust gas treating method according to claim 8, wherein the pulse power source is capable of feeding a pulse current by switching from a first pulse current having a frequency of 100 to 1000 Hz to a second pulse current having a frequency of 500 to 2500 Hz, and vice versa.

11. An exhaust gas treating method according to claim 8, wherein the pulse power source is capable of feeding a pulse current by switching from a third pulse current having a voltage value of 2 to 5 kV to a fourth pulse current having a voltage value of 3 to 20 kV, and vice versa.

12. An exhaust gas treating method according to claim 8, wherein the exhaust gas is exhausted from an automobile engine, and the pulse current is fed by switching, step-by-step, frequency and/or voltage for different values at predetermined time intervals in correspondence with change in revolution and/or load of the engine.

13. An exhaust gas treating method according to claim 8, wherein the exhaust gas is exhausted from an automobile engine, and the predetermined time intervals for switching frequency and/or voltage value for different values is changed step-by-step in correspondence with change in revolution and/or load of the engine.

14. An exhaust gas treating method according to claim 8, wherein a catalyst is further disposed on a downstream side of the portion where the plasma is produced in the passage of exhaust gas to further treat exhaust gas passed through the plasma by the catalyst.

15. The exhaust gas treating method according to claim 8, wherein the switching step comprises switching the pulse current between a low-voltage pulse current and a high-voltage pulse current, the low-voltage pulse current and high-voltage pulse currents having non-zero voltages.

16. An exhaust gas treating apparatus, comprising:
   a case body functioning as a passage of exhaust gas containing substances to be treated, and
   a plasma producer configured to produce plasma inside the case body,
   wherein the plasma producer has one or more pulse electrode and one or more ground electrode that are oppositely disposed in the case body and has a pulse power source capable of feeding a pulse current to the one or more pulse electrode, and
   wherein the pulse power source is configured to automatically switch frequency and/or voltage values at predetermined time intervals to produce plasma of a kind adequate to selectively treat the substances between the one or more pulse electrode and the one or more ground electrode.

17. The exhaust gas treating apparatus according to claim 16, wherein the pulse power source is configured to switch the pulse current between a low-voltage pulse current and a high-voltage pulse current, the low-voltage pulse current and high-voltage pulse currents having non-zero voltages.

* * * * *